2,914,559
MANUFACTURE OF FUMARIC ACID

Walter J. Stefaniak, Checktowaga, N.Y., assignor to Allied Chemical Corporation, a corporation of New York No Drawing. Application March 13, 1958
Serial No. 721,102

6 Claims. (Cl. 260—537)

This invention relates to conversion of maleic acid to fumaric acid.

Heretofore several substances have been found to have the property of catalyzing the isomerization of maleic acid to fumaric acid in aqueous media.

Most such substances, however, are not active and/or selective enough to give commercially satisfactory yields of acceptable product at reasonable cycle times and processing costs. Even prior art processes which have enjoyed established commercial success are subject to certain disadvantages. Thus, use of aqueous hydrochloric acid as a reaction medium requires special equipment to cope with corrosion problems. Use of organic sulfur compounds, such as thiourea, as catalysts, generally yields a fumaric acid contaminated with small amounts of organic sulfur compounds (believed to be pseudothiohydantoin acetic acids and the like) which may cause discoloration of polyester resins made therefrom. Also, experiments have been reported in the chemical literature showing that yields of 2 to 14% of fumaric acid were obtained by isomerizing maleic acid in dilute (circa 10%) sulfuric acid solution containing potassium bromate and ferrous sulfate.

The process of the present invention provides a simple inexpensive method for obtaining high yields of exceptionally pure fumaric acid in short cycle times, using simple equipment of relatively small capacity.

In accordance with the present invention, maleic acid in aqueous solution containing (by weight) 15% to 80% maleic acid and free from strong mineral acids (sulfuric, nitric, or hydrochloric) in concentration (based on total solution) above that providing 0.15% by weight of ionizable hydrogen (total hydrogen of such acid) is treated with soluble bromate to convert maleic acid to fumaric acid. The bromate ion has been found to be a highly effective catalyst for the isomerization under these conditions, providing commercially acceptable yields of fumaric acid. The strong mineral acids have been found to inhibit this catalysis and while concentrations up to that specified can be tolerated, their presence is not desirable.

Maleic acid solutions for treatment by my process may be prepared by dissolving maleic acid or anhydride in water. When it is desired to make a fumaric acid product of high purity, it is advantageous to start with a purified material, such as is obtained by heating the anhydride with $P_2O_5$ and subsequently distilling as described in U.S. Patent 2,343,536. Maleic acid solutions may also be obtained by absorption in water of effluent gases from a catalytic reactor wherein benzene vapor is oxidized with atmospheric oxygen or as a by-product from similar processes for making phthalic anhydride by the catalytic vapor-phase oxidation of naphthalene. The optimum maleic acid concentration is about 40% by weight.

The yield of fumaric acid is adversely affected by the presence of sulfuric acid and falls quite rapidly with rising sulfuric acid concentration above about 0.1%.[1] Some sulfuric acid may be present in maleic acid solutions obtained by the absorption in water of effluent gases from reactors wherein benzene is catalytically oxidized by atmospheric oxygen if the benzene charged contains thiophene or similar sulfur-containing impurities. This sulfuric acid will result in a large loss of yield if present in concentrations above 0.15% by weight of ionizable hydrogen equivalent (7.35% by weight of sulfuric acid based on total solution).

The source of bromate ion may be bromic acid, potassium bromate or any other suitable bromate salt. The amount of bromate required (calculated as $KBrO_3$) may vary widely, e.g. between 0.5 and 50 parts per 1000 parts of maleic acid present. When the maleic acid is of good purity to begin with, from 2 to 5 parts of $KBrO_3$/1000 parts of maleic acid are preferred. When the maleic acid is more contaminated with easily oxidized impurities, a higher concentration of bromate may be required. The activity of the bromate catalyst may be increased by use of sodium perborate or other source of perborate ion therewith. Use of the perborate (which does not, by itself, catalyze the reaction) causes the bromate catalyst to become active at a lower temperature, and may lower the amount of bromate required, particularly when maleic acid containing easily oxidized congeners is used.

Preferably the isomerization reaction is carried out at 70° to 110° C. Both the hydration of maleic anhydride to maleic acid and the isomerization of the maleic acid to fumaric acid are exothermic and the heat of these reactions may be used to provide a large part of the heat required. Usually the precipitation of fumaric acid occurs rather suddenly. A reaction time of not more than one hour suffices for reactions carried out at 95° to 105° C., using solutions of about 40% maleic acid concentration.

The precipitated fumaric acid is isolated by filtration or centrifuging, preferably after the batch has been cooled to about 20° C. If maleic acid of good quality has been used as starting material, the fumaric acid obtained will be very pure and free from contaminants which impart color thereto or to polyester resins made therefrom. Such fumaric acid products, in ethanol solutions of 5% concentration, will generally have a color value less than 10 on the Hazen (cobalt-platinum) scale, as determined by the method described on pp. 87–89 of "Standard Methods for the Determination of Water, Sewage, and Industrial Wastes," 10th edition, 1955, published by the American Public Health Association. If the fumaric is colored or otherwise contaminated, as may occur if certain contaminated maleic acid solutions are used as raw material, it may be decolorized by sludge filtration with an adsorbent.

The following examples illustrate various methods of carrying out the process of the present invention. Quantities are expressed as parts by weight where not otherwise indicated.

EXAMPLE 1

950 parts of molten maleic anhydride (previously purified by heating with $P_2O_5$ and subsequent distillation, as described in U.S. Patent 2,343,536) were added to a solution of 2.5 parts of $KBrO_3$ in 1550 parts of water initially at 95° C. at such a rate that the temperature was held to within the range 100° to 105° C. The resulting solution was charged with an additional 2.5 parts of $KBrO_3$ and held at 100° to 105° C. for one hour. The batch was cooled to 15° to 20° C. and filtered to recover precipitated fumaric acid. The filter cake was washed ---
[1] By weight of ionizable hydrogen.

with cold water (Ca. 400 parts) and dried. A yield of 1068 parts (95% of theory) of fumaric acid was obtained. A 5% solution of the product in ethanol had a color of 10 on the Hazen scale.

EXAMPLE 2

A solution of maleic acid was prepared by dissolving 760 parts of maleic anhydride purified as in Example 1 in 1284 parts of water at 60° C. and was then cooled to 30° C. A catalyst solution was prepared by dissolving two parts of $KBrO_3$ in 100 parts of water. The maleic acid and catalyst solutions were combined at 30° C. The combined solution was continuously charged to a heated, agitated vessel wherein it was maintained at 100–105° C. for a residence time of about 30 minutes. A slurry of precipitated fumaric acid was continuously withdrawn from the vessel via an overflow conduit, cooled to about 20° C., and filtered. A yield of 850 parts (94.5% of theory) of fumaric acid was obtained. A 5% solution of the product in ethanol had a color not exceeding 10 on the Hazen scale.

EXAMPLE 3

950 parts of molten maleic anhydride purified as in Example 1 were added to 950 parts of water at 60° C. to form a maleic acid solution. A catalyst solution was prepared by dissolving 10 parts of $KBrO_3$ and 2.5 parts of sodium perborate ($NaBO_3 \cdot H_2O$) in 150 parts of water. The maleic acid solution was charged with the catalyst solution at 100–105° C. during 30 minutes, and held thereat for about 15 minutes. The fumaric acid product was isolated as described in Example 1. A yield of 1090 parts (97% of theory) was obtained. A 5% ethanol solution of the product had a color not exceeding 10 on the Hazen scale.

EXAMPLE 4

A solution of maleic acid, prepared by dissolving 950 parts of maleic anhydride purified as in Example 1 in 1450 parts of water at 60° C. was cooled to 30° C. and combined with a catalyst solution prepared by dissolving 10 parts of $KBrO_3$ and 2.5 parts of $NaBO_3 \cdot H_2O$ in 100 parts of water. The resulting solution was heated to 100–105° C. during 75 minutes and held thereat for one hour. The fumaric acid product was recovered as described in Example 1. A yield of 1062 parts (94.5% of theory) was obtained. A 5% ethanol solution of the product had a color not exceeding 10 on the Hazen scale.

EXAMPLE 5

Seven sample runs were made by the uniform procedure here given in detail for sample 1.

A one-liter three-neck flask fitted with thermometer, agitator, condenser and addition funnel was charged with 384 g. of water. $KBrO_3$ (0.58 g.) was then added. Molten, purified, maleic anhydride (196 g.) was added during about ½ hour providing a 40% maleic acid solution. A second 0.58 g. portion of $KBrO_3$ was added. The reaction mass was heated to 100° C. whereat fumaric acid precipitated suddenly and vigorous refluxing ensued. Refluxing at about 100° C. was continued for one hour. The batch was then cooled to 20° C., held thereat for ½ hour, and filtered. The filter cake was washed with eight 50 cc. portions of water and dried at 60–80° C. in samples 2–7, but in sample 1 only 175 cc. total water was required.

Samples 2–7 were prepared by a substantially identical procedure, sulfuric acid being added at the beginning with the initial water charge in the amounts indicated in the table below. The extensive washing of the filter cakes was necessary to remove sulfuric acid from samples 2–7.

The table shows fumaric acid yields versus the specified contents of sulfuric acid.

Table 1

| Sample | $H_2SO_4$ Concentration | | Yield Percent Theory |
|---|---|---|---|
| | Wt. Percent | Wt. Percent Ionizable H | |
| 1 | 0 | 0 | 96.5 |
| 2 | 1.5 | .031 | 94.9 |
| 3 | 3.0 | .061 | 95.0 |
| 4 | 4.15 | .085 | 88.8 |
| 5 | 5.1 | .104 | 84.3 |
| 6 | 6 | .122 | 81.1 |
| 7 | 10 | .204 | 41.1 |

Sample 1 was analyzed for product quality and found excellent in all respects, as shown in the following table.

Fumaric acid _____Percent__ 99.9
Maleic acid _____do____ 0.04
Moisture _____do____ 0.02
Ash _____do____ 0.01
Chloride _____do____ 0.01
Color of 5% ethanol solution Hazen scale _____ 5

EXAMPLE 6

Crude maleic acid solution was obtained as follows: a mixture of air and benzene vapors containing 30 to 35 parts of air per part of benzene was passed over an oxidation catalyst comprising a mixture of oxides of vanadium, molybdenum and uranium coated on an "Alundum" carrier while the catalyst was maintained at 500° to 540° C. the contact time being about 0.1 second. The effluent gas from the catalytic converter contained about 2% maleic anhydride, 2% water vapor, and 5% carbon dioxide, the remainder being principally nitrogen together with traces of benzene, carbon monoxide, other partial oxidation products, and other impurities. The gas was cooled to 125° C. and introduced below the surface of a body of water in an absorber.

583 parts of the resulting solution, containing 266 parts of maleic acid were heated to 70–75° C. and aerated thereat for 6 hours to remove part of the impurities present. The solution was then charged at 64° C. with 5 parts of $NaBO_3 \cdot H_2O$ and 5.5 parts of $KBrO_3$ (added in increments) and an additional 1.0 part of $NaBO_3 \cdot H_2O$. Isomerization started, causing the temperature to rise to 95° C. from the exothermic heat of reaction developed, and fumaric acid precipitated out. An additional 1.5 parts of $KBrO_3$ were added. The batch was maintained at about 95° C. for about 10 minutes and then cooled to 20° C. and filtered. A yield of 232 parts (87.2% of theory) of fumaric acid was obtained as crystals having a light brown color.

EXAMPLE 7

Crude maleic acid solution was obtained as follows: Naphthalene was catalytically oxidized to phthalic anhydride by a high temperature vapor-phase process generally similar to the process described in Example 6 for making maleic anhydride from benzene. Effluent gas from the converter was cooled to condense out most of the phthalic anhydride. Residual gas from the condenser was absorbed in water. The resulting solution was cooled to crystallize out phthalic acid which was filtered off. The mother liquor separated as a filtrate had a total acidity equivalent to about 46% by weight of maleic acid.

7430 parts of mother liquor containing a total acidity equivalent to 3410 parts of maleic acid were charged with 175 parts of $KBrO_3$ during a 4-hour period wherein the temperature rose from 28° to 71° C. from heat of reaction. The batch was heated at 75° C. for about 10 minutes, cooled to room temperature and filtered. 2850 parts of fumaric acid were recovered as crystals having a medium brown color.

To obtain a product of high purity, 350 parts of the crude crystals were dissolved in 4000 parts of boiling water, the solution was charged and agitated with 14 parts of "Nuchar" decolorizing charcoal and then filtered while hot, and the filtrate was cooled to room temperature to precipitate out the fumaric acid. Yield was 289 parts of white crystals.

A 5% ethanol solution of the product had a color not above 10 on the Hazen scale. The product was of the very high purity required of fumaric to be used for making colorless polyester resins as evidenced by the fact that a styrene solution of a polyester resin made from propylene glycol and the fumaric acid of this example was substantially colorless.

I claim:

1. The process for making fumaric acid, which comprises treating with soluble bromate, maleic acid in aqueous solution containing 15% to 80% maleic acid and free from strong mineral acids in concentration above that providing 0.15% of ionizable hydrogen.

2. The process of claim 1 in which the treatment with bromate is carried out at 70–110° C.

3. The process of claim 1 in which the treatment with bromate is carried out with perborate ions present in the solution.

4. The process of claim 2 in which bromate ($BrO_3$) is present in amount corresponding to 0.5–50 parts $KBrO_3$ per 1000 parts maleic acid.

5. The process of claim 3 in which the bromate ($BrO_3$) and perborate ($BO_3$) are each present in amount corresponding to 0.5–50 parts $KBrO_3$ and $NaBO_3 \cdot H_2O$, respectively, per 1000 parts maleic acid.

6. The process for making fumaric acid, which comprises treating with soluble bromate for at least about ⅙ hour at 70–100° C., maleic acid in aqueous solution containing 15% to 80% maleic acid and free from strong mineral acids in concentration above that providing 0.15% of ionizable hydrogen, cooling the solution, and separating the formed crystalline fumaric acid from the mother liquor.

References Cited in the file of this patent

UNITED STATES PATENTS

| | | |
|---|---|---|
| 2,494,049 | Levin | Jan. 10, 1950 |
| 2,790,827 | Cummings et al. | Apr. 30, 1957 |

OTHER REFERENCES

Wacholtz: Chem. Abs., v. 22, p. 908 (1928).

"Advanced Organic Chemistry," Wheland, 2nd ed., November 1954 (pp. 306–315).